United States Patent
Jacobson et al.

(10) Patent No.: US 9,430,007 B2
(45) Date of Patent: Aug. 30, 2016

(54) VOLTAGE REGULATOR STRESS REDUCING SYSTEM

(71) Applicant: Lenovo Enterprise Solutions (Singapore) Pte. Ltd., Singapore (SG)

(72) Inventors: Steven C. Jacobson, Mebane, NC (US); Loc X. Nguyen, Raleigh, NC (US); Luke D. Remis, Raleigh, NC (US); Timothy R. Tennant, Durham, NC (US); Brian C. Totten, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 269 days.

(21) Appl. No.: 14/260,345

(22) Filed: Apr. 24, 2014

(65) Prior Publication Data
US 2015/0309559 A1   Oct. 29, 2015

(51) Int. Cl.
*G06F 1/24* (2006.01)
*G06F 1/26* (2006.01)
*G06F 1/28* (2006.01)
*G06F 15/17* (2006.01)
*G06F 15/177* (2006.01)

(52) U.S. Cl.
CPC . *G06F 1/24* (2013.01); *G06F 1/26* (2013.01); *G06F 1/28* (2013.01); *G06F 15/177* (2013.01)

(58) Field of Classification Search
CPC .............. G06F 1/24; G06F 1/26; G06F 1/28; G06F 15/177
See application file for complete search history.

(56) References Cited

U.S. PATENT DOCUMENTS

| | | | |
|---|---|---|---|
| 7,376,854 B2 | 5/2008 | Lehwalder et al. | |
| 7,774,633 B1* | 8/2010 | Harrenstien | G06F 1/24 713/300 |
| 8,386,806 B2 | 2/2013 | Ooi et al. | |
| 8,489,907 B2* | 7/2013 | Wakrat | G06F 1/3225 713/300 |
| 8,832,421 B2* | 9/2014 | Salomone | G06F 9/4401 455/418 |
| 2004/0059905 A1 | 3/2004 | Soulier | |
| 2013/0207630 A1 | 8/2013 | Rahardjo et al. | |

* cited by examiner

*Primary Examiner* — Stefan Stoynov
(74) *Attorney, Agent, or Firm* — Katherine S. Brown; Jeffrey L. Streets

(57) ABSTRACT

According to one exemplary embodiment, a method for reducing electrical component stress from power cycling is provided. The method may include receiving an indication associated with power cycling an electronic apparatus. The method may also include identifying, based on the received indication, a first one or more groups of electrical components that will not be powered off during the power cycling of the electronic apparatus. The method may further include identifying, based on the received indication, a second one or more groups of electrical components that will be powered off during the power cycling of the electronic apparatus. The method may finally include powering off the second one or more groups of electrical components.

9 Claims, 4 Drawing Sheets

VOLTAGE REGULATOR STRESS REDUCING SYSTEM

BACKGROUND

The present invention relates generally to the field of computing, and more particularly to voltage regulator stress.

Operators of electronic devices, such as servers, commonly power cycle their electronic devices on and off repeatedly to test system stability. This power cycling may be done for, among other things, testing system hardware or testing the software stack for stability. Through repeated power cycling, electronic device operators may become confident that the electronic device will boot properly to the operating system and reinitialize device drivers and peripherals.

SUMMARY

According to one exemplary embodiment, a method for reducing electrical component stress from power cycling is provided. The method may include receiving an indication associated with power cycling an electronic apparatus. The method may also include identifying, based on the received indication, a first one or more groups of electrical components that will not be powered off during the power cycling of the electronic apparatus. The method may further include identifying, based on the received indication, a second one or more groups of electrical components that will be powered off during the power cycling of the electronic apparatus. The method may finally include powering off the second one or more groups of electrical components.

According to another exemplary embodiment, a computer system for reducing electrical component stress from power cycling is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving an indication associated with power cycling an electronic apparatus. The method may also include identifying, based on the received indication, a first one or more groups of electrical components that will not be powered off during the power cycling of the electronic apparatus. The method may further include identifying, based on the received indication, a second one or more groups of electrical components that will be powered off during the power cycling of the electronic apparatus. The method may finally include powering off the second one or more groups of electrical components.

According to yet another exemplary embodiment, a computer program product for reducing electrical component stress from power cycling is provided. The computer program product may include one or more computer-readable storage devices and program instructions stored on at least one of the one or more tangible storage devices, the program instructions executable by a processor. The computer program product may include program instructions to receive an indication associated with power cycling an electronic apparatus. The computer program product may also include program instructions to identify, based on the received indication, a first one or more groups of electrical components that will not be powered off during the power cycling of the electronic apparatus. The computer program product may further include program instructions to identify, based on the received indication, a second one or more groups of electrical components that will be powered off during the power cycling of the electronic apparatus. The computer program product may finally include program instructions to power off the second one or more groups of electrical components.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
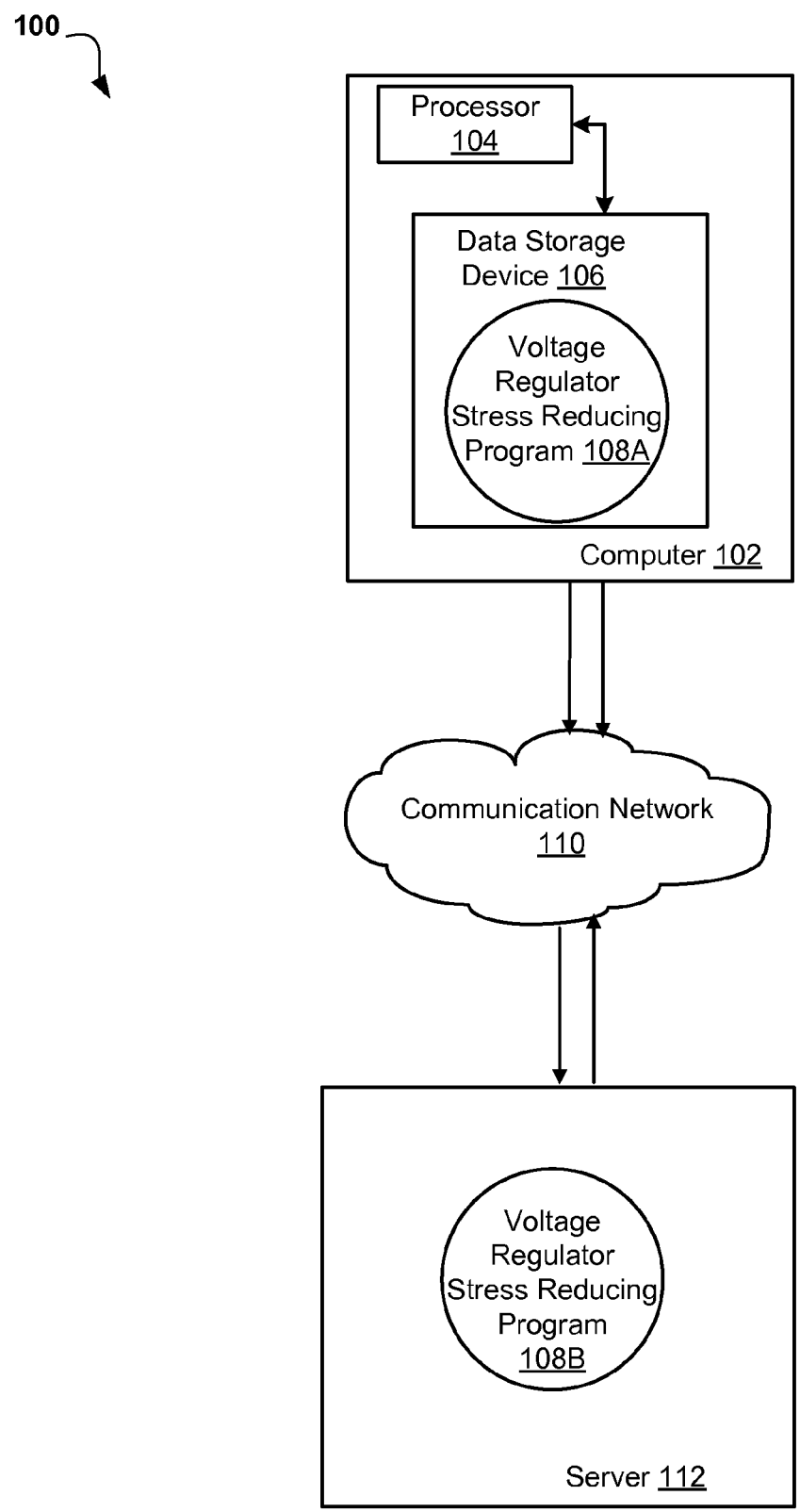
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

When voltage regulators are cycled off and on, the solder joints and interconnects associated with the power devices and circuitry may be exposed to atypically high current densities not found in normal operation. As such, repetitive exposure to relatively stressful conditions at system startup events, the voltage regulation circuitry lifetime may be reduced due to electromigration. Additionally, some voltage regulators may be exposed to overvoltage stress specifically during system startup, with potentially damaging consequences. Therefore, it would be advantageous to, among other things, reduce the stresses associated with power cycling that voltage regulators and other electronic components are subjected to in order to mitigate potential damage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for reducing voltage regulator stress.

Referring now to FIG. 1, an exemplary networked computer environment 100 in accordance with one embodiment is depicted. The networked computer environment 100 may include a computer 102 with a processor 104 and a data storage device 106 that is enabled to run a voltage regulator stress reducing program 108A. The networked computer environment 100 may also include a server 112 that is enabled to run a voltage regulator stress reducing program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a voltage regulator stress reducing program 108A and 108B may run on the client computer 102 or on the server computer 112. The voltage regulator stress reducing program 108A and 108B may be utilized to reduce the stress voltage regulators are subjected to during server computer 112, client computer 102, or other electronic apparatus power cycling events. The voltage regulator stress reducing program 108A and 108B is explained in further detail below with respect to FIG. 3.

Figure 2:
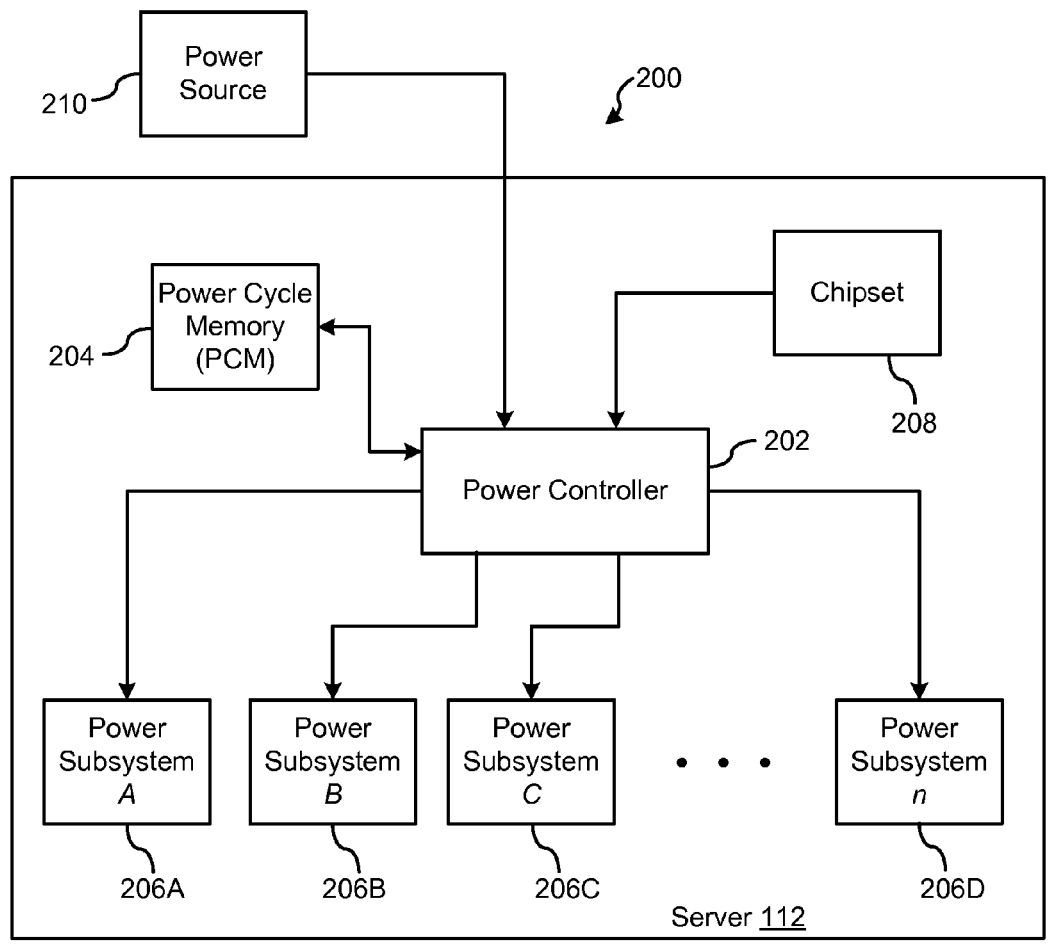
FIG. 2 is a block diagram of the voltage regulator stress reducing system according to at least one embodiment.

FIG. 2, a block diagram of a voltage regulator stress reducing system 200 according to at least one embodiment is depicted. The voltage regulator stress reducing system 200 may include a power controller 202, a power cycle memory (PCM) 204, and a plurality of power subsystems 206A-D associated with an electronic apparatus such as, for example, a server 112. Additionally, the server 112 may include a chipset 208 and the server 112 may receive power from a power source 210.

Power controller 202 may be utilized for providing power to individual power subsystems 206A-D from the power source 210. The power controller 202 may also be utilized for powering off individual power subsystems 206A-D. The power controller 202 may power off one or more individual power subsystems 206A-D in response to receiving an indication to power off or power cycle the electronic apparatus from a hardware component, such as chipset 208 located on the server's 112 motherboard, or a baseboard management controller (BMC).

For example, the power controller 202 in an electronic apparatus, such as a server 112 having an x86 architecture, may identify an indication (i.e., request) from a chipset 208 to power cycle the server 112 by reading a register, such as a 0xCF9 register. The power controller 202 may also, for example, detect power cycling indirectly by using a timer to measure the time between when the server 112 turns off and the server 112 turns back on. If the timer has recorded a time delta consistent with a power cycle event (e.g., 5 seconds) occurring in multiple consecutive instances, the power controller 202 may respond by a though a power cycle event has occurred the next time the electronic apparatus turns off as a power cycle event. It may be appreciated that requests for power cycling may be indicated in other ways. The method associated with the voltage regulator stress reducing program 108A, 108B (FIG. 1) that the power controller 202 may use to select which power subsystems 206A-D to leave powered on and which to power off in response to receiving an indication for power cycling will be discussed in further detail below with reference to FIG. 3. As such, according to one implementation, power subsystems 206A-D that are not selected to remain powered on during power cycling, may be powered off for a short period of time (e.g., 5 seconds) and then powered back on by the power controller 202 to complete the power cycling event.

The PCM 204 may include nonvolatile memory that may be accessed by the power controller 202 for making determinations about what power subsystems 206A-D may be powered off when power cycling the server 112 or other electronic apparatus. According to at least one implementation of the present embodiment, the history of power subsystem 206A-D power cycling may be stored in the PCM 204 as a data structure, such as a queue, containing identifiers corresponding to each power subsystem 206A-D in the server 112.

Additionally, according to the present embodiment, power subsystems 206A-D may correspond to electrical components (e.g., voltage regulators) used to provide the correct voltage to computer components that may be associated with the server 112 such as system memory, processor, storage devices, etc. For example, power subsystem A 206A may correspond with one or more voltage regulators that step-down a 12 volt input to the proper operating voltage (e.g., 1.35 volts) for one or more system RAM modules. In another example, however, power subsystem B 206B may correspond with the one or more voltage regulators that provide the proper operating voltage (e.g., 1.0 volt) to a CPU.

Figure 3:
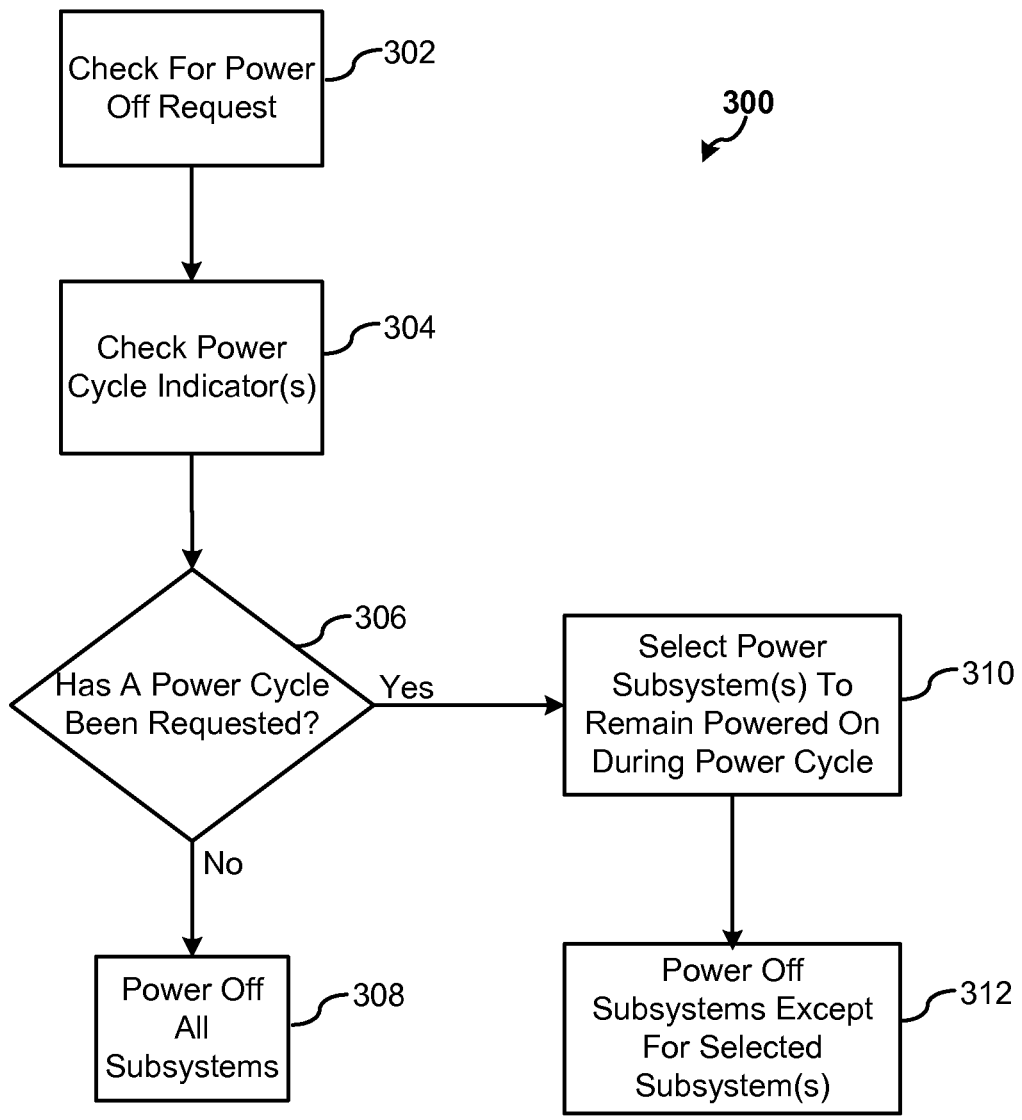
FIG. 3 is an operational flow chart illustrating a process for reducing voltage regulator stress according to at least one embodiment.

Referring now to FIG. 3, an operational flow chart illustrating the exemplary process 300 by the voltage regulator stress reducing program 108A and 108B (FIG. 1) according to at least one embodiment is depicted. At 302, the process 300 may check if the power controller 202 (FIG. 2) has received a power off request. For example, a power off request may be received by the power controller 202 (FIG. 2) from the chipset 208 (FIG. 2) in response to a request from an operating system to power off the server 112 (FIG. 1). The process 300 may then, for example, query the power controller 202 (FIG. 2) to check for a pending power off request.

Next, at 304, the process 300 may check for an indication that a power cycle is being requested. As stated above, the request for a power cycle may, for example, be made by writing to a register designated to indicate a power cycle request that the process 300 may be read at this time. Alternate implementations may utilize other indicators for a power cycle and more than one possible indicator may be checked by the process 300. For example, a BMC may indicate a power cycle request, while the chipset has not written to the register that indicates a power cycle request. Therefore the process 300 may check for multiple possible indications to ascertain a power cycle request.

At 306 a determination is made as to whether a power cycle has been requested. Therefore, if at 306, the process has determined that a power cycle has not been requested, then at 308, the power controller 202 (FIG. 2) may power off all power subsystems 206A-D (FIG. 2) to fulfill the power off request that the power controller 202 (FIG. 2) may have received.

However, if at 306 the process 300 determines that a power cycle has been requested, then at 310, the process 300 may select one or more power subsystems 206A-D (FIG. 2) to leave powered on during the power cycling event. The process 300 may, for example, determine which one or more power subsystems 206A-D (FIG. 2) to leave powered on during the power cycle event based on: a uniform wear leveling scheme across all power subsystems 206A-D (FIG. 2); knowledge that certain voltage regulators (e.g., for system RAM 206A: FIG. 2) have a propensity to fail due to stress; user defined settings (e.g., the user wants system RAM to always power cycle); voltage regulator temperatures; or the recent utilization of the computer components that the power subsystem is powering. The process may also utilize a combination of different schemes to select power subsystems 206A-D (FIG. 2) to leave powered on during the power cycle event.

For example, according to at least one implementation, the power controller 202 (FIG. 2) may select power subsystems 206A-D (FIG. 2) to not be powered off during a power cycling event based on a wear leveling scheme. A wear leveling scheme may be implemented such that the power subsystems 206A-D (FIG. 2) may be power cycled equally over the course of many power cycle events, however each power subsystem 206A-D (FIG. 2) may be power cycled fewer times than the total number of times the server 112 (FIG. 1) has power cycled. For example, a wear leveling scheme may be implemented as a queue in the PCM 204 (FIG. 2) listing each power subsystem 206A-D (FIG. 2). The process 300 may then select the first power subsystem (e.g., 206A: FIG. 2) at the head of the queue to leave powered on while power cycling the remainder of the power subsystems (e.g., 206B-206D: FIG. 2). The process 300 may also remove the power subsystem (e.g., 206A: FIG. 2) listed at the head of the queue, and then place that power subsystem (e.g., 206A: FIG. 2) at the tail end of the queue. Thus, one power subsystem may avoid the wear normally associated with power cycling at each power cycling event.

According to another implementation, the power controller 202 (FIG. 2) may select power subsystems 206A-D (FIG. 2) to not power off during power cycling based on the knowledge that certain power subsystems 206A-D (FIG. 2) have a propensity to fail due to power cycling stress. The process 300 may take into account the propensity for certain power subsystems to fail due to stress by biasing the power subsystems with a propensity for stress induced failure to power cycle less often than the other power subsystems present in the server 112 (FIG. 1). This may be implemented, for example, by first populating a queue with all power subsystems 206A-D (FIG. 2). To bias the one or more power subsystems with a propensity for stress induced failure, power subsystems with a propensity for stress induced failure may, for example, be listed in the queue twice while the remaining power subsystems may be listed once. The process 300 may then utilize the queue, as discussed above with reference to the previous implementation, by selecting the power subsystem at the head of the queue to not power cycle during the power cycling event, and then moving that power subsystem to the tail of the queue. Thus, the one or more power subsystems with a propensity for stress induced failure may be at the head of the queue more often than the other power subsystems and may be selected to not power cycle as often as the other power subsystems. Additionally, knowledge of power subsystems with a propensity for stress induced failure may be derived, for example, from a server manufacturer that has collected data showing certain power subsystems may be failing at higher rates than others due to the stresses involved in power cycling. This knowledge may then, for example, be passed from the server manufacturer to the power controller 202 (FIG. 2) associated with an individual server 112 (FIG. 1) through a firmware update identifying which power subsystems 206A-D (FIG. 2) with a propensity for stress induced failure may be present within the server 112 (FIG. 1).

According to yet another implementation, the power controller 202 (FIG. 2) may select power subsystems 206A-D (FIG. 2) to not power off during a power cycle event based on a user defined preference. This may be implemented by a field in the PCM 204 (FIG. 2) that stores one or more power subsystems that the user has indicated may not power cycle (e.g., the CPU 206B: FIG. 2) during a power cycle event. The remaining power subsystems (e.g., 206A, 206C, 206D: FIG. 1) may be power cycled according to some other scheme such as, for example, the wear leveling scheme discussed above.

According to one other implementation, the power controller 202 (FIG. 2) may select power subsystems 206A-D (FIG. 2) to always power off during a power cycle event based on a user defined preference. This may be implemented by a field in the PCM 204 (FIG. 2) that stores one or more power subsystems that the user has indicated may always power cycle (e.g., system RAM 206A: FIG. 1) during a power cycle event. The remaining power subsystems (e.g., 206B-206D: FIG. 1) may be power cycled according to some other scheme such as, for example, the wear leveling scheme discussed above.

In another implementation, the power controller 202 (FIG. 2) may select power subsystems 206A-D (FIG. 2) to not power off during a power cycling event based on the measured temperatures of electrical components (e.g., voltage regulators) in the power subsystem. For example, monitoring software may record voltage regulator temperatures from the last time the server 112 (FIG. 1) booted. Then the process 300 may access the temperature records for the voltage regulators in each power subsystem 206A-D (FIG. 2) and determine that the power subsystem with the greatest average recorded temperature may be selected to remain powered on during the power cycle event.

In yet another implementation, the power controller 202 (FIG. 2) may select power subsystems 206A-D (FIG. 2) to not power off during a power cycling event based on the utilization level of the computer components (e.g., CPU, RAM, etc.) powered by the power subsystems 206A-D (FIG. 2). For example, monitoring software may record the utilization level of the computer components since the last time the server 112 (FIG. 1) booted. The process 300 may then access the computer component utilization level records to identify computer components (e.g., CPU, RAM, etc.) that may have been highly utilized since the last time the server 112 (FIG. 1) booted. The power subsystems associated with highly utilized computer components may then be selected by the process 300 to remain powered on during the power cycle event.

Finally, at 312, the remaining power subsystems that were not selected at 310 may be powered off to fulfill the power cycle request.

Figure 4:
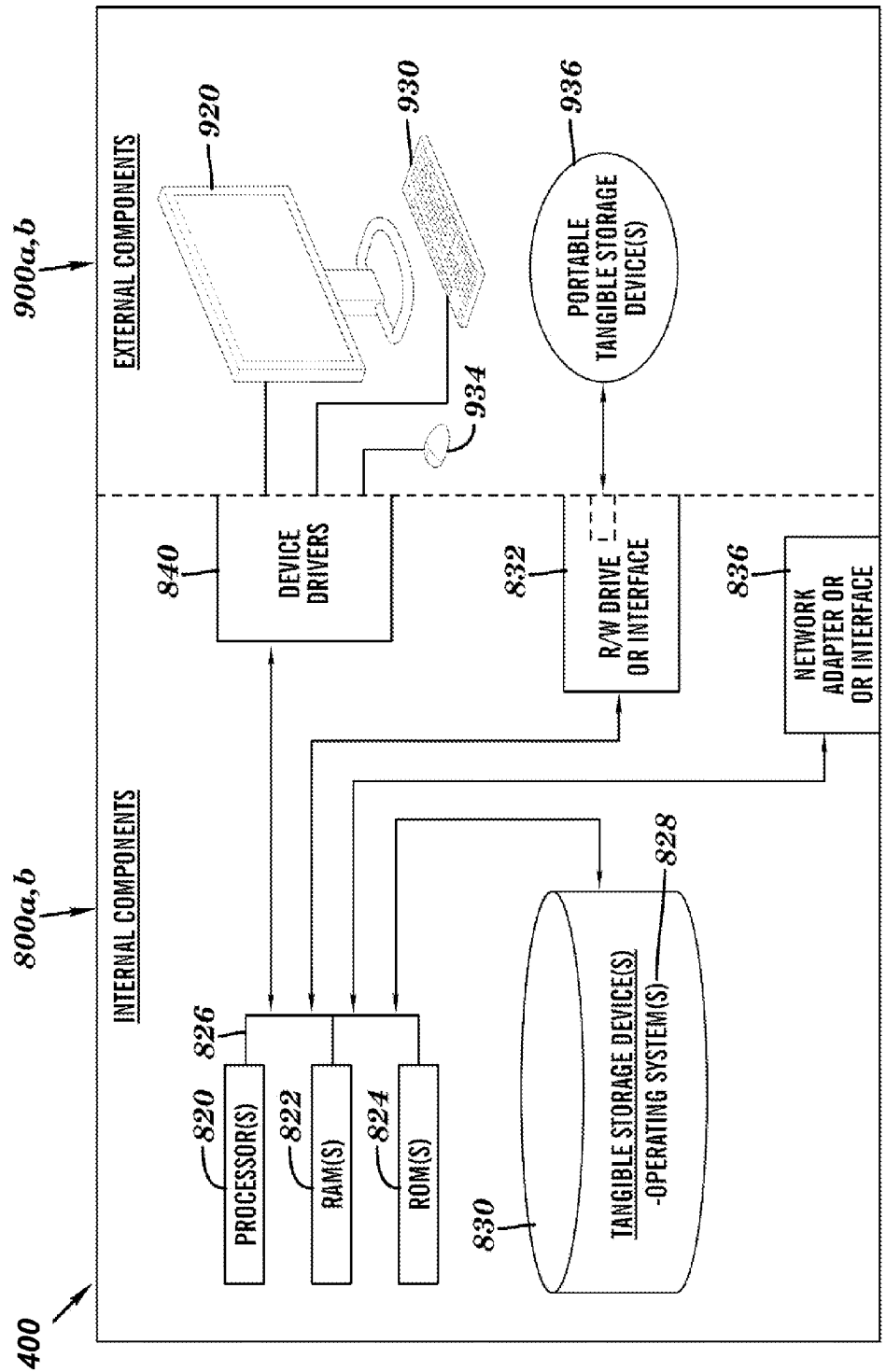
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a voltage regulator stress reducing program 108A and 108B (FIG. 1), may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The voltage regulator stress reducing program 108A and 108B (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The voltage regulator stress reducing program 108A (FIG. 1) in client computer 102 (FIG. 1) and the voltage regulator stress reducing program 108B (FIG. 1) in network server computer 112 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the voltage regulator stress reducing program 108A (FIG. 1) in client computer 102 (FIG. 1) and the voltage regulator stress reducing program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices.

Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing electrical component stress from power cycling, the method comprising:
receiving an indication associated with power cycling an electronic apparatus;
identifying, based on the received indication, a first one or more groups of electrical components that will not be powered off during the power cycling of the electronic apparatus;
identifying, based on the received indication, a second one or more groups of electrical components that will be powered off during the power cycling of the electronic apparatus; and
powering off the second one or more groups of electrical components, wherein the identifying of the first one or more groups of electrical components that will not be powered off during the power cycling of the electronic apparatus is based on the number of times each of the first and the second one or more groups of electrical components has been powered off previously.

2. A method for reducing electrical component stress from power cycling, the method comprising:
receiving an indication associated with power cycling an electronic apparatus;
identifying, based on the received indication, a first one or more groups of electrical components that will not be powered off during the power cycling of the electronic apparatus;
identifying, based on the received indication, a second one or more groups of electrical components that will be powered off during the power cycling of the electronic apparatus; and powering off the second one or more groups of electrical components, wherein the identifying of the first one or more groups of electrical components that will not be powered off during the power cycling of the electronic apparatus comprises selecting one group of electrical components from a queue including both the first and the second one or more groups of electrical components.

3. The method of claim 2, wherein the identifying of the first one or more groups of electrical components that will not be powered off during the power cycling of the electronic apparatus comprises removing the first one or more group of electrical components from a head of the queue and placing the first one or more group of electrical components at an end of the queue.

4. A method for reducing electrical component stress from power cycling, the method comprising:

receiving an indication associated with power cycling an electronic apparatus;

identifying, based on the received indication, a first one or more groups of electrical components that will not be powered off during the power cycling of the electronic apparatus;

identifying, based on the received indication, a second one or more groups of electrical components that will be powered off during the power cycling of the electronic apparatus; and powering off the second one or more groups of electrical components, wherein the identifying of the first one or more groups of electrical components that will not be powered off during the power cycling of the electronic apparatus is based on determining a propensity to fail from repeated power cycling associated with the first and the second one or more groups of electrical components.

5. A method for reducing electrical component stress from power cycling, the method comprising:

receiving an indication associated with power cycling an electronic apparatus;

identifying, based on the received indication, a first one or more groups of electrical components that will not be powered off during the power cycling of the electronic apparatus;

identifying, based on the received indication, a second one or more groups of electrical components that will be powered off during the power cycling of the electronic apparatus; and powering off the second one or more groups of electrical components, wherein the identifying of the first one or more groups of electrical components that will not be powered off during the power cycling of the electronic apparatus is based on a temperature of the electrical components associated with each of the one or more groups of electrical components.

6. A method for reducing electrical component stress from power cycling, the method comprising:

receiving an indication associated with power cycling an electronic apparatus;

identifying, based on the received indication, a first one or more groups of electrical components that will not be powered off during the power cycling of the electronic apparatus;

identifying, based on the received indication, a second one or more groups of electrical components that will be powered off during the power cycling of the electronic apparatus; and powering off the second one or more groups of electrical components, wherein the identifying of the first one or more groups of electrical components that will not be powered off during the power cycling of the electronic apparatus is based on a utilization level of one or more computer components associated with each of the one or more groups of electrical components.

7. A computer system for reducing electrical component stress from power cycling, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving an indication associated with power cycling an electronic apparatus;

identifying, based on the received indication, a first one or more groups of electrical components that will not be powered off during the power cycling of the electronic apparatus;

identifying, based on the received indication, a second one or more groups of electrical components that will be powered off during the power cycling of the electronic apparatus; and powering off the second one or more groups of electrical components, wherein the identifying of the first one or more groups of electrical components that will not be powered off during the power cycling of the electronic apparatus comprises selecting one group of electrical components from a queue including both the first and the second one or more groups of electrical components.

8. The computer system of claim 7, further comprising:

generating the queue containing each of the first and the second one or more groups of electrical components;

selecting the first one or more groups of electrical components located at a head of the queue to not be powered off; and moving the first one or more group of electrical components in the queue to an end of the queue in response to identifying the first and second one or more groups of electrical components.

9. The computer system of claim 7, wherein the identifying of the first one or more groups of electrical components that will not be powered off during the power cycling of the electronic apparatus comprises removing the first one or more group of electrical components from a head of the queue and placing the first one or more group of electrical components at an end of the queue.

* * * * *